United States Patent
Young et al.

(10) Patent No.: US 12,541,579 B2
(45) Date of Patent: Feb. 3, 2026

(54) TRACKING QUANTUM-BASED INTERACTIONS

(71) Applicant: Bank of America Corporation, Charlotte, NC (US)

(72) Inventors: Michael Young, Davidson, NC (US); Manu Kurian, Dallas, TX (US); Ana Maxim, Arlington, VA (US)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 18/401,636

(22) Filed: Jan. 1, 2024

(65) Prior Publication Data
US 2025/0217458 A1    Jul. 3, 2025

(51) Int. Cl.
*G06F 21/31* (2013.01)
*G06N 10/40* (2022.01)

(52) U.S. Cl.
CPC ............ *G06F 21/31* (2013.01); *G06N 10/40* (2022.01)

(58) Field of Classification Search
CPC ......... G06F 21/31; G06N 10/40; G06N 10/60
See application file for complete search history.

(56) References Cited

U.S. PATENT DOCUMENTS

| | | | | |
|---|---|---|---|---|
| 6,477,145 B1 * | 11/2002 | Moore | ................. | H04L 47/193 370/231 |
| 6,665,295 B1 * | 12/2003 | Burns | ................. | H04L 12/5601 370/395.6 |
| 6,671,682 B1 * | 12/2003 | Nolte | ................. | G06F 16/9538 707/999.005 |
| 10,284,496 B2 * | 5/2019 | Castinado | ............. | G06Q 40/02 |
| 10,848,712 B1 * | 11/2020 | Rao | ................... | H04N 21/4307 |
| 11,019,004 B1 * | 5/2021 | Sohrweide | ............. | H04L 51/02 |
| 11,362,844 B1 * | 6/2022 | Cook | ................... | H04L 9/3265 |
| 11,537,728 B1 * | 12/2022 | Esbensen | ............. | H04L 9/0819 |
| 11,626,983 B1 * | 4/2023 | Carter, Jr. | ........... | G06F 16/2219 380/28 |
| 11,663,510 B1 * | 5/2023 | Carter, Jr. | ............. | B82Y 10/00 257/31 |
| 11,727,829 B1 * | 8/2023 | Arbajian | ................. | H04L 9/14 380/28 |
| 11,736,281 B1 * | 8/2023 | Maganti | ............. | G06F 16/2219 713/150 |

(Continued)

*Primary Examiner* — Aravind K Moorthy
(74) *Attorney, Agent, or Firm* — Weiss & Arons LLP

(57) ABSTRACT

Systems, methods, and apparatus are provided for tracking user interactions in a quantum system. An authentication persona may be routed to a quantum processor. The quantum processor may generate a virtual quantum channel. The virtual quantum channel may execute multiple attribute-based authentication chains concurrently. The quantum processor may dynamically change the attributes in the authentication chains for the duration of a user session. The quantum processor may substantially continuously validate the attributes in each chain for the duration of the user session. The quantum processor may map the virtual authentication channel to a potential state of quantum information. In some embodiments, the system may automatically scale the quantum processor during an authentication task by adding additional quantum circuits to each quantum thread when the authentication task has a duration that is longer than a threshold duration and/or a volume that is larger than a threshold volume.

17 Claims, 9 Drawing Sheets

(56) References Cited

U.S. PATENT DOCUMENTS

| | | | |
|---|---|---|---|
| 11,750,378 B1* | 9/2023 | Carter, Jr. | G06F 21/577 713/150 |
| 11,863,552 B1* | 1/2024 | Rao | H04L 63/0861 |
| 11,949,463 B1* | 4/2024 | Septon | H04B 10/70 |
| 12,321,821 B2* | 6/2025 | Ramette | G06N 10/40 |
| 2005/0203835 A1* | 9/2005 | Nhaissi | G06Q 20/10 705/40 |
| 2011/0202968 A1* | 8/2011 | Nurmi | G06F 21/10 726/1 |
| 2013/0185165 A1* | 7/2013 | Vanderhook | H04L 67/60 709/217 |
| 2013/0339724 A1* | 12/2013 | Amit | H04L 63/0272 713/151 |
| 2013/0344877 A1* | 12/2013 | Ma | H04W 16/04 455/446 |
| 2015/0188897 A1* | 7/2015 | Grigorovici | H04L 67/535 726/4 |
| 2015/0223008 A1* | 8/2015 | Watson | H04W 4/60 455/414.1 |
| 2017/0006009 A1* | 1/2017 | Hessler | G06F 21/316 |
| 2017/0272393 A1* | 9/2017 | Nimushakavi | H04L 12/1822 |
| 2017/0330233 A1* | 11/2017 | Bruno | G06Q 30/0281 |
| 2018/0183650 A1* | 6/2018 | Zhang | H04W 72/21 |
| 2018/0248892 A1* | 8/2018 | Hefetz | H04W 12/06 |
| 2018/0248894 A1* | 8/2018 | Greeter | H04L 63/1425 |
| 2018/0262276 A1* | 9/2018 | Bishop | H04B 10/70 |
| 2018/0262489 A1* | 9/2018 | Wadley | H04L 63/083 |
| 2018/0276749 A1* | 9/2018 | Bangad | G06Q 10/067 |
| 2019/0289588 A1* | 9/2019 | Akkarakaran | H04L 5/0025 |
| 2019/0312698 A1* | 10/2019 | Akkarakaran | H04W 72/046 |
| 2020/0106778 A1* | 4/2020 | Park | H04L 65/612 |
| 2020/0128063 A1* | 4/2020 | Griffin | H04L 67/289 |
| 2020/0201655 A1* | 6/2020 | Griffin | G06F 9/4494 |
| 2020/0334107 A1* | 10/2020 | Katabarwa | G06N 10/20 |
| 2020/0374211 A1* | 11/2020 | Griffin | H04L 45/04 |
| 2020/0382219 A1* | 12/2020 | Innes | H04W 12/04 |
| 2020/0387821 A1* | 12/2020 | Griffin | G06F 21/6209 |
| 2021/0044433 A1* | 2/2021 | Hay | H04L 9/0855 |
| 2021/0175976 A1* | 6/2021 | Rahman | H04L 9/0855 |
| 2021/0176055 A1* | 6/2021 | Rahman | H04L 9/0855 |
| 2021/0297890 A1* | 9/2021 | Chakravarty | G06F 16/00 |
| 2021/0306852 A1* | 9/2021 | Medwed | H04L 63/0428 |
| 2021/0319478 A1* | 10/2021 | Dejardins | G06T 19/006 |
| 2022/0084085 A1* | 3/2022 | Rigetti | H04M 15/8214 |
| 2022/0108318 A1* | 4/2022 | Ramasamy | G06N 5/045 |
| 2022/0164253 A1* | 5/2022 | On | G06N 10/80 |
| 2022/0166762 A1* | 5/2022 | Srour | H04L 63/108 |
| 2022/0166773 A1* | 5/2022 | Trost | H04L 63/0807 |
| 2022/0191049 A1* | 6/2022 | Kohler | H04L 9/3231 |
| 2022/0318348 A1* | 10/2022 | Sims | G06F 21/32 |
| 2022/0330174 A1* | 10/2022 | Huang | H04W 52/325 |
| 2022/0376925 A1* | 11/2022 | Kaizer | H04L 61/4511 |
| 2022/0382605 A1* | 12/2022 | Griffin | G06F 9/546 |
| 2023/0058994 A1* | 2/2023 | Vacon | G06F 12/0895 |
| 2023/0088643 A1* | 3/2023 | Del Pino Ruiz | G06N 10/60 706/62 |
| 2023/0119693 A1* | 4/2023 | Srivastava | H04L 1/203 370/329 |
| 2023/0126764 A1* | 4/2023 | Ibrahim | G06N 10/20 705/44 |
| 2023/0188548 A1* | 6/2023 | Bhaskar | G06N 10/60 726/22 |
| 2023/0236873 A1* | 7/2023 | Nguyen | G06N 5/01 718/102 |
| 2023/0244663 A1* | 8/2023 | Chandroliya | G06N 5/01 707/713 |
| 2023/0308948 A1* | 9/2023 | Jia | H04W 28/24 |
| 2023/0327982 A1* | 10/2023 | Rahman | H04W 36/14 370/228 |
| 2023/0359993 A1* | 11/2023 | Raz | G06Q 10/0875 |
| 2023/0403557 A1* | 12/2023 | Hawkinson | H04W 12/069 |
| 2023/0419149 A1* | 12/2023 | Semo | G06N 10/40 |
| 2024/0013080 A1* | 1/2024 | Pinho | G06N 10/80 |
| 2024/0031829 A1* | 1/2024 | Mahimkar | H04W 28/0226 |
| 2024/0039881 A1* | 2/2024 | Tsuchiya | H04L 51/52 |
| 2024/0073010 A1* | 2/2024 | Ganguly | H04L 63/083 |
| 2024/0155713 A1* | 5/2024 | Naik | H04W 76/15 |
| 2024/0177044 A1* | 5/2024 | Gokhale | G06N 10/20 |
| 2024/0195834 A1* | 6/2024 | Septon | H04L 63/1475 |
| 2024/0205973 A1* | 6/2024 | Ryu | H04W 72/12 |
| 2024/0256940 A1* | 8/2024 | Griffin | G06N 10/00 |
| 2024/0265289 A1* | 8/2024 | Takeori | G06N 7/01 |
| 2024/0296369 A1* | 9/2024 | Stockert | G06N 10/80 |
| 2024/0322915 A1* | 9/2024 | Verma | H04B 10/70 |
| 2024/0340090 A1* | 10/2024 | Hodges | H04B 10/29 |
| 2024/0353238 A1* | 10/2024 | Seifoory | H04B 10/70 |
| 2024/0354617 A1* | 10/2024 | Mentovich | G06N 10/20 |
| 2024/0354618 A1* | 10/2024 | Seifoory | G06N 10/40 |
| 2024/0411604 A1* | 12/2024 | Khattar | G06N 10/60 |
| 2024/0412424 A1* | 12/2024 | Hu | G06N 10/00 |
| 2025/0028991 A1* | 1/2025 | Woerner | G06N 10/00 |
| 2025/0038967 A1* | 1/2025 | Lamas Linares | H04L 9/0852 |
| 2025/0061363 A1* | 2/2025 | Lakshmanan | G06N 10/40 |
| 2025/0063055 A1* | 2/2025 | Toohey | H04L 63/0876 |
| 2025/0125945 A1* | 4/2025 | Akhter | H04L 9/3231 |
| 2025/0131304 A1* | 4/2025 | Falk | G06N 10/70 |
| 2025/0131317 A1* | 4/2025 | Lamas Linares | G06N 10/20 |

* cited by examiner

TRACKING QUANTUM-BASED INTERACTIONS

FIELD OF TECHNOLOGY

Aspects of the disclosure relate to information transfer protocols for quantum-based computing systems.

BACKGROUND OF THE DISCLOSURE

Quantum computing systems may provide tremendous advantages over classical data processing and storage. In classical computing, bits hold only one of two values and the number of states is limited. In quantum computing, entangled qubits may hold all possible values at the same time, enabling many more states with a much smaller number of qubits. As such, quantum computers may work much faster and handle much more data than classical computers. Quantum algorithms may create multidimensional computational spaces, allowing quantum computing to more efficiently solve complex problems that are beyond the reach of classical computing.

An enterprise may need to track or audit user interactions with enterprise systems for security, regulatory compliance, or other purposes. However, in a quantum-based computing system, where quantum information exists in multiple states, it may be difficult to associate the information with a user. Further, the user may interact with quantum data in a variety of contexts, and it may be difficult to provide a comprehensive picture of interactions by a single user.

It would be desirable to provide a protocol for tracking and auditing interactions across a quantum system. It would further be desirable to leverage features of the quantum system to comprehensively register interactions for each user engaging with the system.

SUMMARY OF THE DISCLOSURE

Systems, methods, and apparatus are provided for tracking interactions in a quantum computing system.

A quantum processor may generate a virtual authentication channel. The virtual authentication channel may involve a plurality of entangled qubits in a state of superposition.

The virtual authentication channel may include a first quantum authentication chain. The first quantum authentication chain may involve a first set of attributes associated with a user identity.

The virtual authentication channel may include a second quantum authentication chain. The second quantum authentication chain may involve a second set of attributes associated with a user device.

The virtual authentication channel may include a third quantum authentication chain. The third quantum authentication chain may involve a third set of attributes associated with a user environment.

The virtual authentication channel may validate each set of attributes substantially continuously for the duration of a user computing session. The quantum processor may map the virtual authentication channel to a state of quantum information.

In some embodiments, the virtual authentication channel may be one of a set of virtual authentication channels, each virtual authentication channel associated with a potential state of the quantum information.

In some embodiments, the quantum processor may also generate a set of virtual control channels, each virtual control channel associated with a potential state of the quantum information.

In response to user access of the quantum information, the quantum processor may map the virtual authentication channel from the set of virtual authentication channels and a virtual control channel from the set of virtual control channels to the state of the quantum information.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
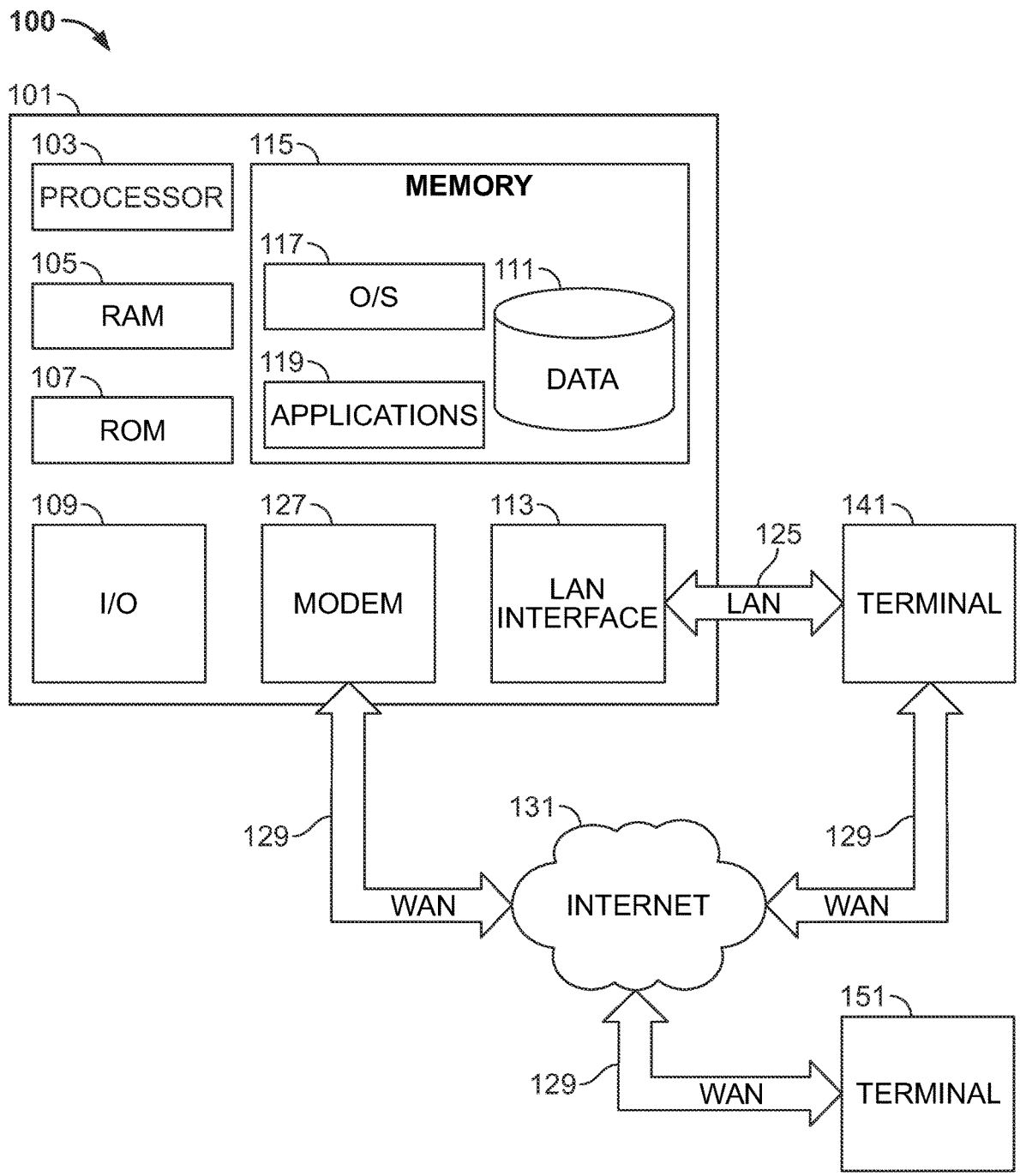
FIG. 1 shows illustrative apparatus in accordance with principles of the disclosure.

Systems, methods, and apparatus are provided for tracking interactions in a quantum computing system.

For the sake of illustration, the invention will be described as being performed by a "system." The system may include one or more features of apparatus and methods that are described herein and/or any other suitable device or approach.

The system may include a classical (i.e., non-quantum) processor. The system may include a quantum processor. A quantum processor may be used herein to refer to a computing device whose operations can harness aspects of quantum mechanics, such as superposition, interference, and entanglement.

Quantum processors are associated with vastly improved efficiencies over classical computers. For example, classical computers represent data in bits, which can be either 0 or 1. Quantum processors use qubits which utilize superposition (i.e., the ability to be in multiple states at the same time) to allow for a state of 0, 1, or any probability of being 0 or 1.

The probabilities can be manipulated using matrix-based quantum gates, which are analogous to classical logic gates. Qubits are therefore able to represent many more data possibilities than a bit-based system of the same size. This allows for greater speed and less memory usage than classical systems.

A qubit in a state of superposition does not have a defined value because it holds many potential values at the same time. When measured, the qubit wave function collapses to a defined state. When an entangled qubit is in a state of superposition, each of its entangled connections is also in a state of superposition. These combinations of uncertainties exponentially increase the power of quantum computers.

The quantum processor may include a default number of quantum threads. Each quantum thread may include a default number of quantum circuits. Quantum circuits, in turn, refer to hardware and software based computational models that include quantum gates and are used for executing quantum computations. For example, in some embodiments, at least one of the quantum circuits may include a Toffoli gate. A feature of the Toffoli gate is its universal nature-meaning it is able to represent classical operations as well as quantum. In certain embodiments, at least one of the quantum circuits may include a Hadamard gate. A feature of the Hadamard gate is the ability to represent a superposition state.

Because quantum data may exist in multiple states simultaneously, tracking movement of the data through an enterprise system presents a technical challenge.

The system may generate multiple virtual channels each associated with a potential state of the data. These virtual channels may enable multi-dimensional tracking for quantum system data that exists in multiple states.

The virtual channel may be a quantum channel. A quantum channel may transmit quantum information. In some embodiments, a quantum channel may also transmit classical information. The quantum channel may be viewed as a quantum operation. The quantum operation may include a trace-preserving map between operator spaces. An operator may represent processes that result in a change of state for the quantum information.

A first set of virtual channels may include enterprise control data. A control channel may carry control plane information such as control codes associated with a data transfer. Each virtual control channel may be associated with a potential state of the quantum information.

A second set of virtual channels may include user authentication data. The authentication data may be associated with a user persona. Each virtual authentication channel may be associated with a potential state of the quantum information.

The system may map a virtual channel associated with control data and/or a virtual channel associated with authentication data to the quantum information. At the time of user access, the quantum information in a state of superposition may decohere and collapse to a single state. The virtual channel may be mapped to the state of the quantum information for auditing and tracking of the quantum information.

The system may involve persona-based authentication. A persona typically represents an identity that shares common enterprise responsibilities, experiences, and access. For example, a single user may interact with enterprise systems both as an employee and as a customer. Typically, each type of interaction may require different permissions and authentication protocols.

Persona-based authentication may include attribute-based access control protocols. Attributes may be values of components that are used in an access event. The system may determine whether the attributes match existing policies.

Attributes associated with a user identity may describe the person attempting to obtain system access. Illustrative identity attributes include security clearance level, department, job title, user ID, management level, biometric features, and any other suitable criteria.

Attributes associated with a resource may describe the object that has received a request for access, such as a file, application, server, or API. Illustrative resource attributes may include creation date, author, owner, file name, file type, data sensitivity, and any other suitable criteria.

Attributes associated with an environment may describe the context of the access request. Illustrative environmental attributes may include time of access attempt, location of access event, user device type, communication protocol, normal user patterns, number of past transactions within a defined time period, and any other suitable criteria.

The system may generate a primary persona for a user. The primary persona may be associated with a set of attributes. The system may generate a subsidiary persona for a user. The subsidiary persona may be associated with the primary persona. Authentication protocols for each subsidiary persona may involve the same attributes as the primary persona. An audit of system interactions for a primary persona may call up interactions for each associated subsidiary persona. For the purposes of this application, the primary persona may be referred as a user "persona." For the purposes of this application, any subsidiary personas associated with the primary persona may be referred to as user "subpersonas."

In a quantum computing system, the enhanced speed and capacity may augment persona-based authentication. The system may include a first authentication chain for user attributes. In some embodiments, the system may include a second authentication chain for resource attributes. In some embodiments, the system may include a third authentication chain for environment attributes. The system may include additional authentication chains as needed. The authentication chains may be superimposed in a virtual quantum channel.

Classical attribute-based authentication protocols typically involve a small, limited number of attributes. In contrast, the quantum computing system may authenticate thousands or millions of attributes.

Similarly, classical authentication protocols typically authenticate attributes at the initial point of access. In contrast, the quantum computing system may refresh the authentication as frequently as every nanosecond. This may allow for substantially continuous authentication throughout a user session.

In the quantum computing system, the attributes selected for authentication may also be dynamically changed in a substantially continuous manner. In some embodiments, the attributes selected for authentication may be changed on a periodic basis at predetermined intervals of time.

The virtual authentication channel may include an authentication chain. The authentication chain may be a trust chain. In a trust chain, a classical system may rely on certifications such as application certificates for authentication. A quantum system may use its superior speed and computing power to independently authenticate each step in the chain.

The system may include an artificial intelligence (AI) engine. The AI engine may include a machine learning model. The machine learning model may be trained using previously executed authentication protocols or using any suitable training data. The AI engine may determine a cutoff point. The cutoff point may involve a determination that the that the user persona has been validated to an acceptable error percentage. The AI engine may determine an acceptable error percentage.

At the cutoff point, the system may halt the substantially continuous authentication of the user persona. At the cutoff point, the system may halt the dynamic changing of attributes selected for authentication. In some embodiments, in place of substantially continuous validation, the AI engine may determine an acceptable interval between validation attempts. In some embodiments, the AI engine may adjust the intervals between the dynamic changing of attributes for validation. The AI engine may determine an acceptable number of attributes of validation. The AI engine may determine a list of specific attributes for validation.

A method for authentication using a quantum-computing-powered system with multi-dimensional scaling is provided. The method may include routing an authentication persona to a quantum processor comprising a default number of quantum threads, each quantum thread comprising a default number of quantum circuits.

The method may include initiating a virtual quantum channel using the quantum processor. The virtual quantum channel may involve a first attribute-based authentication chain. The virtual quantum channel may involve a second attribute-based authentication chain. The virtual quantum channel may involve a third attribute-based authentication chain.

The method may include dynamically changing the attributes in the first authentication chain. The method may include dynamically changing the attributes in the second authentication chain. The method may include dynamically changing the attributes in the third authentication chain. The attributes may be dynamically changed on a random and/or a periodic basis for the duration of a user session. The method may include refreshing the authentication of the attributes in each chain for the duration of the user session.

The method may include converting a first authentication plan to a second authentication plan suited for the quantum processor.

The method may include routing an authentication protocol for a user subpersona to the quantum processor. The method may include identifying an authentication protocol for a user persona associated with the subpersona. The method may include executing attribute-based authentication chains associated with the user persona.

The method may include automatically scaling the quantum processor during an authentication task. The scaling may include adding additional quantum circuits to each quantum thread when the authentication task is detected to have a duration that is longer than a threshold duration. The scaling may include adding additional quantum threads when the authentication task is detected to have a volume that is larger than a threshold volume.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of a establishing communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for quantum channel authentication as detailed herein.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
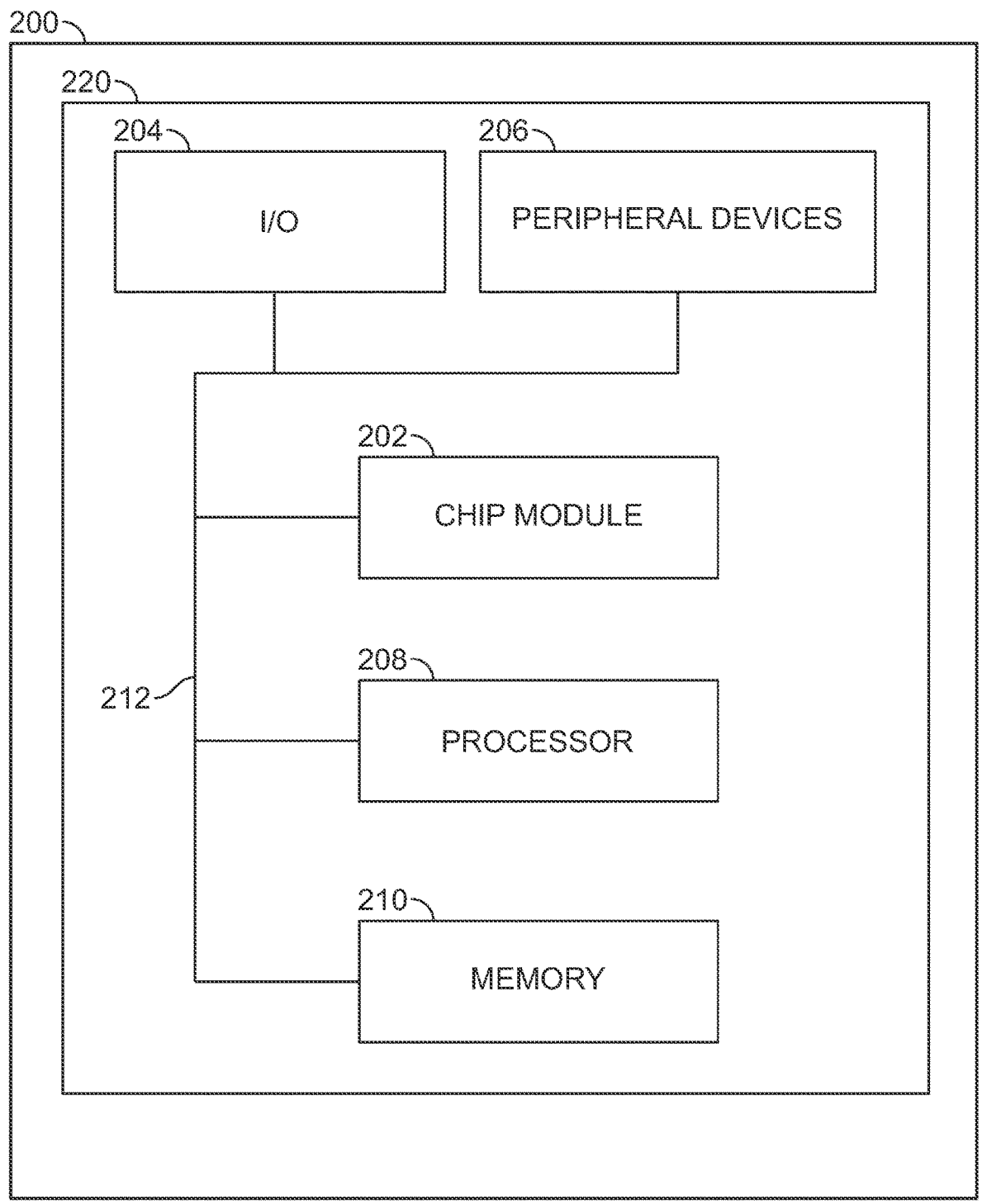
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
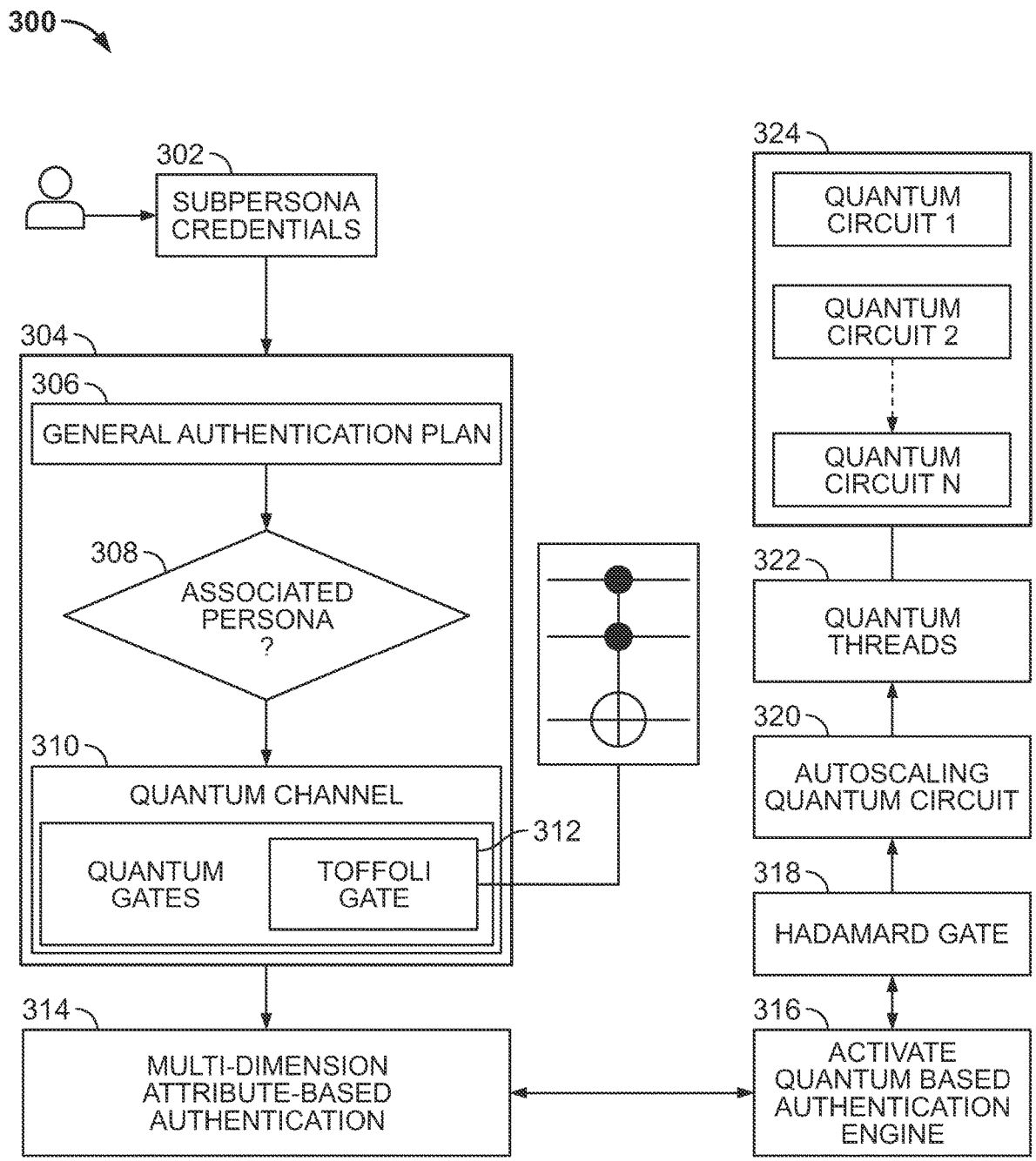
FIG. 3 shows an illustrative diagram in accordance with principles of the disclosure.

FIG. 3 shows illustrative diagram 300 in accordance with principles of the disclosure. Diagram 300 shows architecture and process steps of a quantum-computing-powered system for tracking quantum interactions. Subpersona credentials may be received from a user at 302. At engine 304, the system may process the credentials and generate general authentication plan 306. At 308, the system may determine whether the subpersona is associated with a persona for attribute-based authentication. The authentication may be routed to quantum channel 310, which may include Toffoli gate 312.

The system may validate the attributes at 314 using a quantum processor, which may be activated at 316. The quantum processor may include Hadamard gate 318. The quantum processor may include automatic scaling 320. The quantum processor may be initialized with a default size that may include a certain number of quantum threads 322, each thread including a number of quantum circuits 324. The scaling may include dynamically adjusting the number of threads and/or circuits based on the present computing task.

Figure 4:
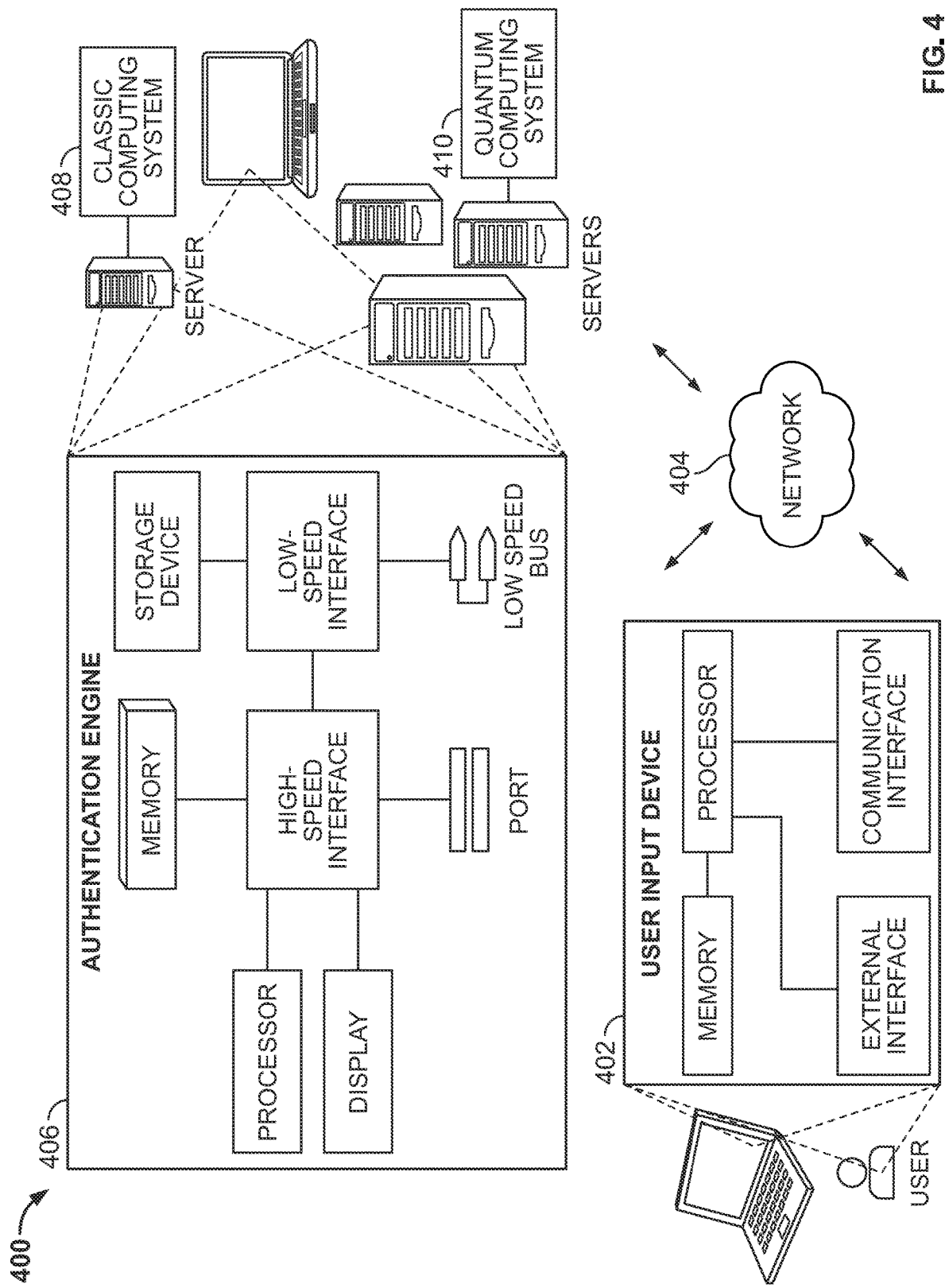
FIG. 4 shows an illustrative diagram in accordance with principles of the disclosure.

FIG. 4 shows illustrative architecture diagram 400 in accordance with principles of the disclosure. Diagram 400 includes user input device 402, and authentication engine 406, some or all of which may be in communication with each other via network 404.

User input device 402 may include a memory, processor, external interface, and communication interface. Authentication engine 406 may include a processor, a display, memory, high-speed and low-speed interfaces, connection ports, and suitable memory devices and communication busses. The system may include classic computing system 408 and quantum computing system 410, which may execute queries and various computing tasks according to the methods and configurations disclosed herein.

Figure 5A:
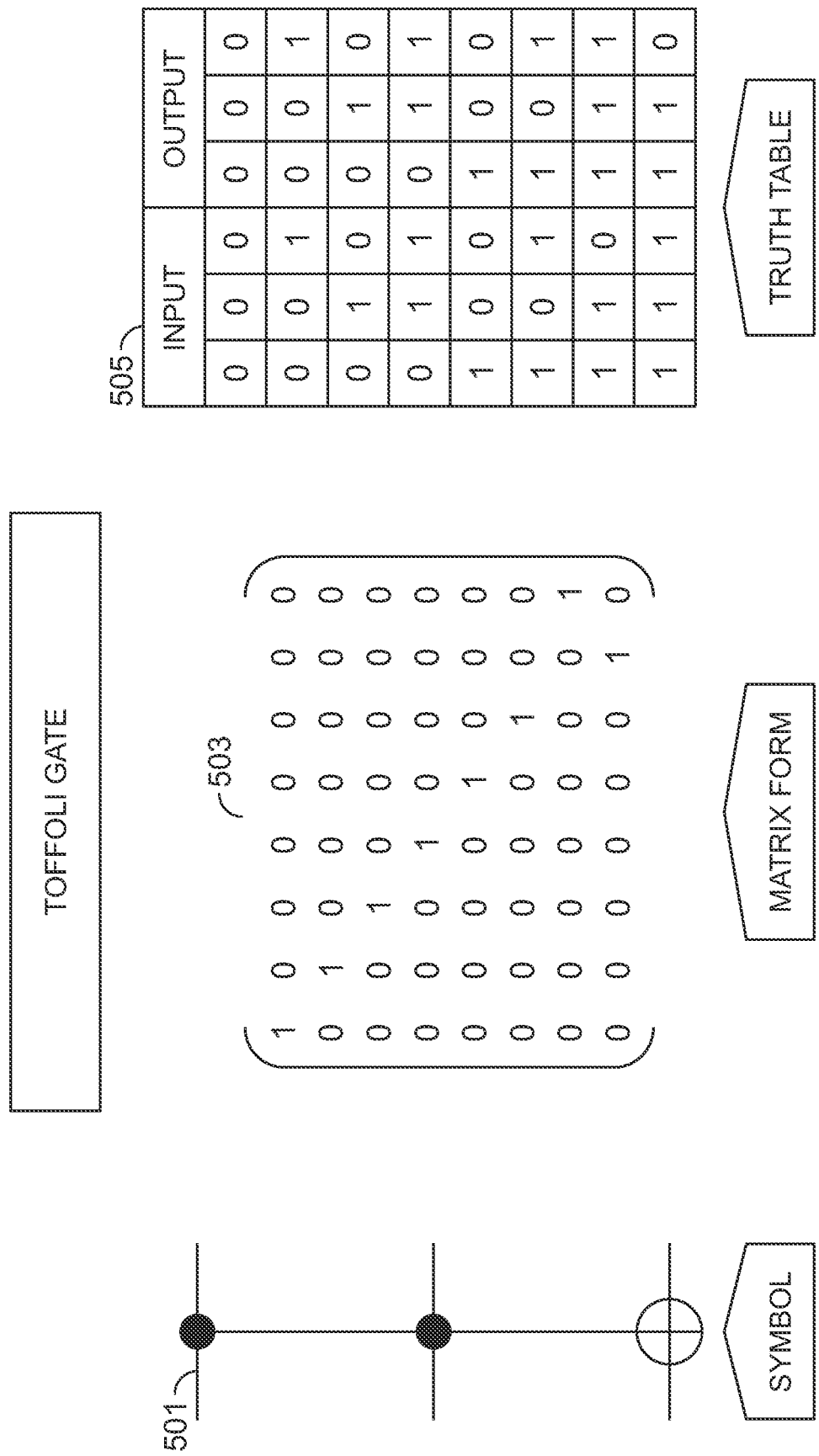
FIGS. 5A and 5B show illustrative diagrams in accordance with the principles of the disclosure.
Figure 5B:
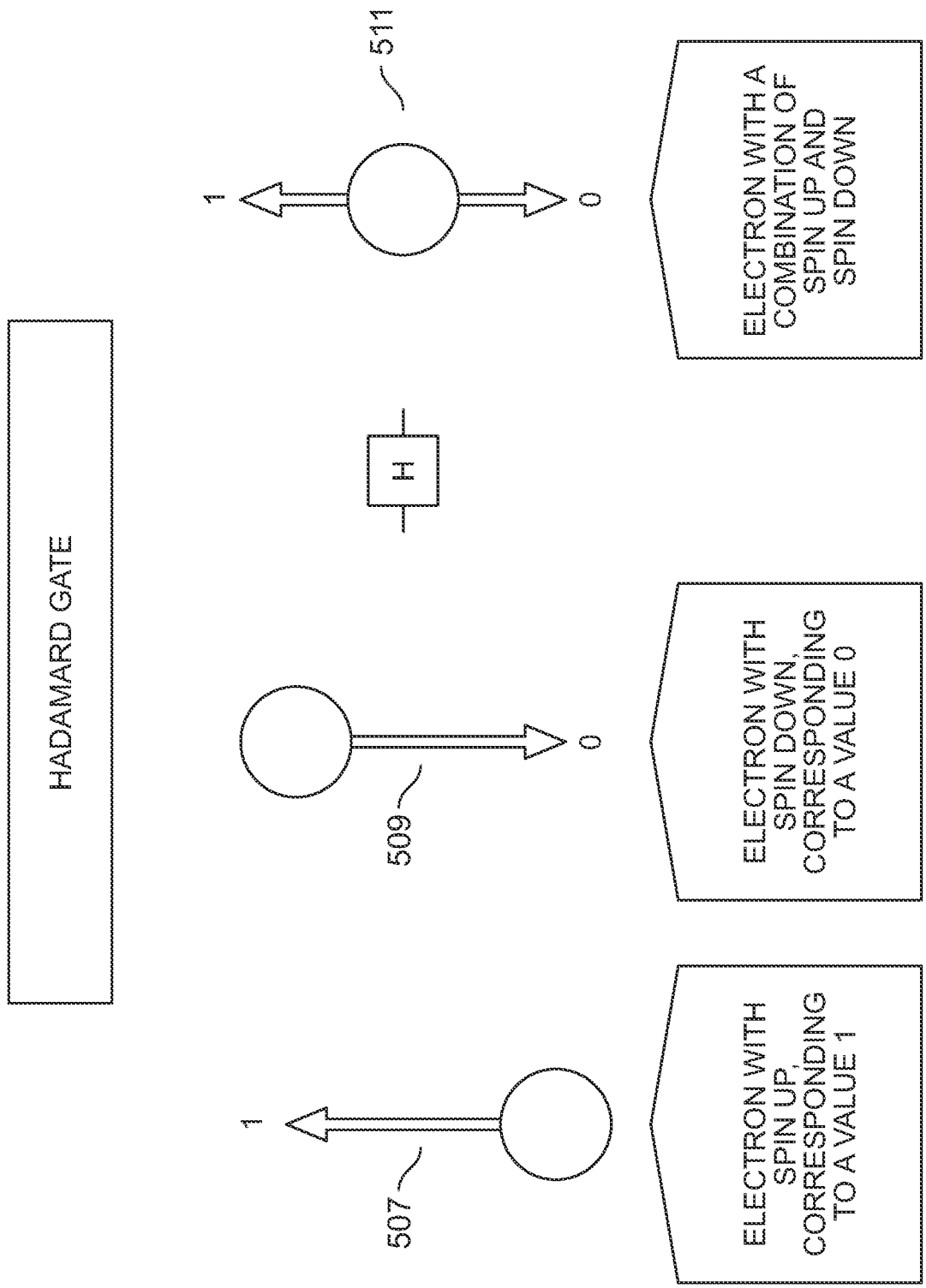

FIGS. 5A-5B show illustrative diagrams of exemplary quantum gates in accordance with principles of the disclosure.

FIG. 5A shows symbol 501, matrix form 503, and truth table 505 of a Toffoli gate. A Toffoli gate is a universal reversible logic gate, which means that it enables simulation of any classical reversible circuit. In operation, as seen in truth table 505, the Toffoli gate has a 3-bit input and a 3-bit outputs. The first two output bits always mirror the first two input bits. The third bit also stays the same unless the first two input bits are both set to 1-in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figure 6:
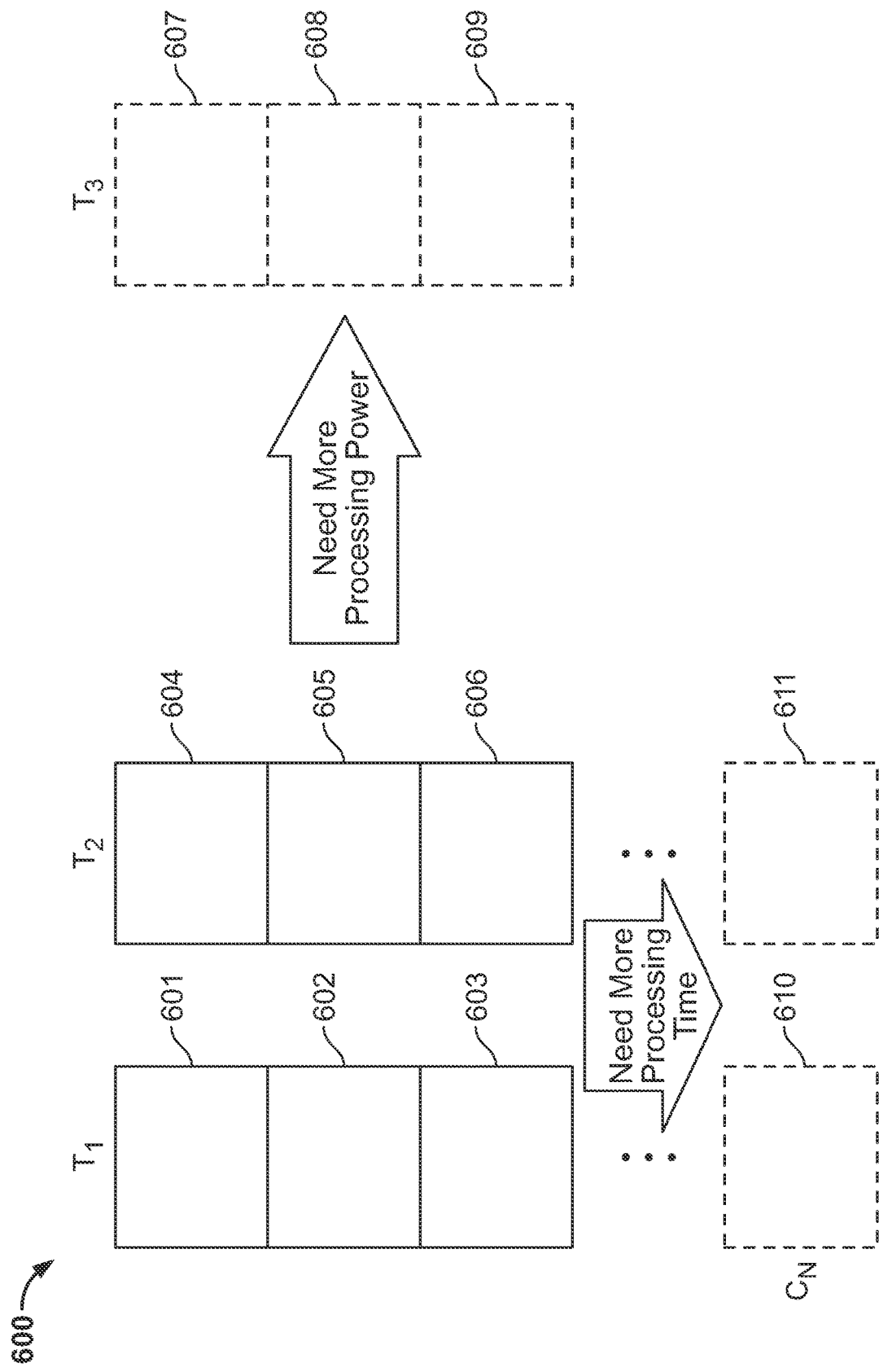
FIG. 6 shows an illustrative diagram in accordance with the principles of the disclosure.

FIG. 6 shows illustrative diagram 600 in accordance with principles of the disclosure. Diagram 600 shows scaling of a quantum processor as disclosed herein. In an illustrative default initialization, the quantum processor may include a first quantum thread T1 that includes quantum circuits 601-603 and a second quantum thread T2 that includes quantum circuits 604-606. When the system detects a need for more processing power, a third quantum thread T3 may be added which may include quantum circuits 607-609. When the system detects a need for more processing time, a fourth quantum circuit 610 and 611 may be added to each existent thread.

Figure 7:
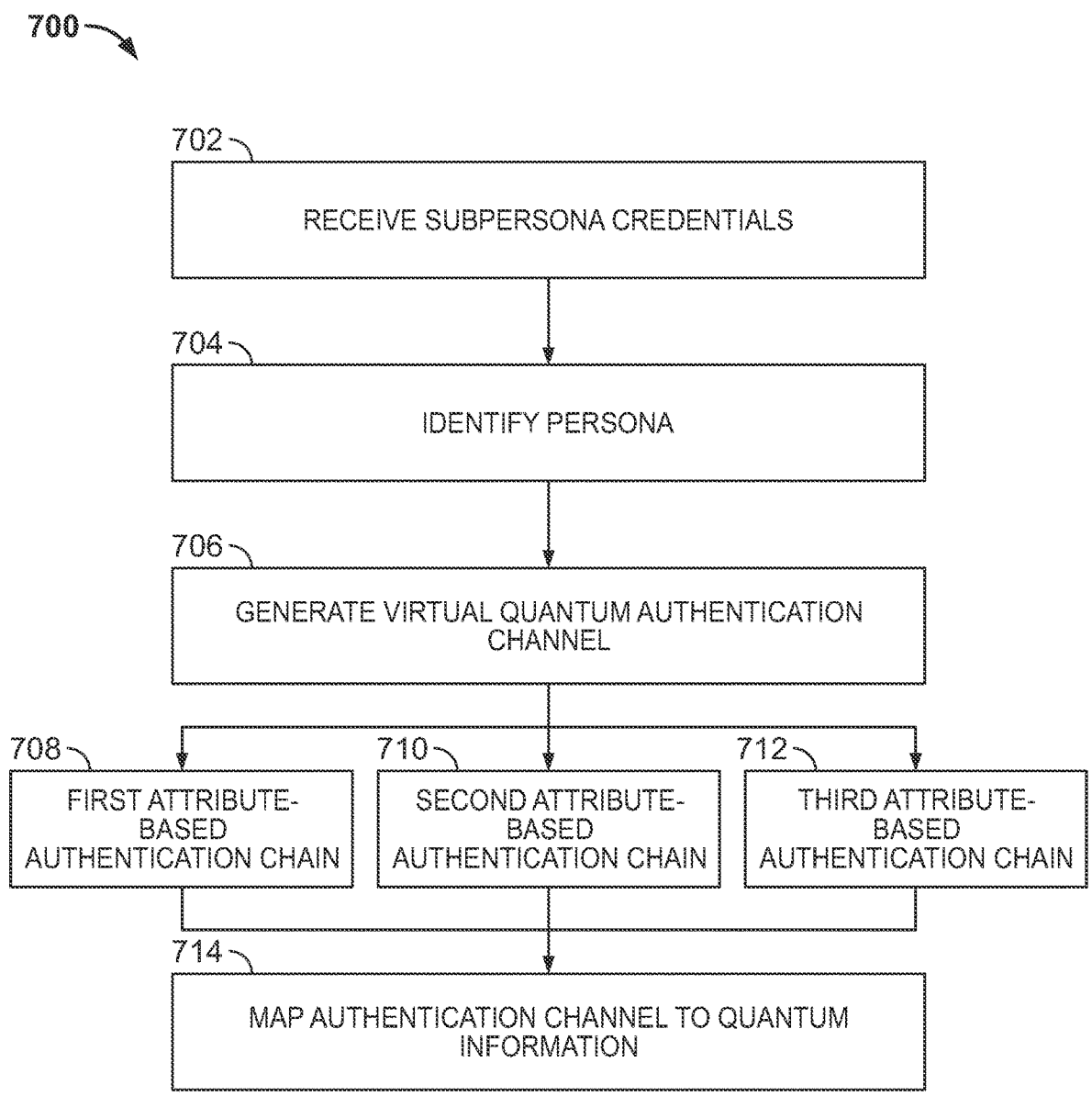
FIG. 7 shows an illustrative process flow in accordance with the principles of the disclosure.

FIG. 7 shows illustrative process flow 700 for tracking quantum interactions using a virtual authentication channel. At 702, the system may receive subpersona credentials. At 704, the system may identify a persona associated with the subpersona credentials for attribute-based authentication at a quantum processor. At 706, the quantum processor may generate a virtual authentication channel. At 708-712, the virtual authentication chain may simultaneously validate a first attribute-based authentication chain, a second attributed-based authentication chain, and a third attribute-based authentication chain. Any suitable number of authentication chains may be validated by the virtual authentication channel. In some embodiments, the validation may be substantially continuously refreshed for the duration of a user session. In some embodiments, the attributes validated by each chain may be changed on a periodic or random basis in the course of the user session.

At 714, the virtual authentication channel may be mapped to state of quantum information. The mapping may occur when stateless quantum information is accessed by a user, collapsing the qubit data to a defined state.

Figure 8:
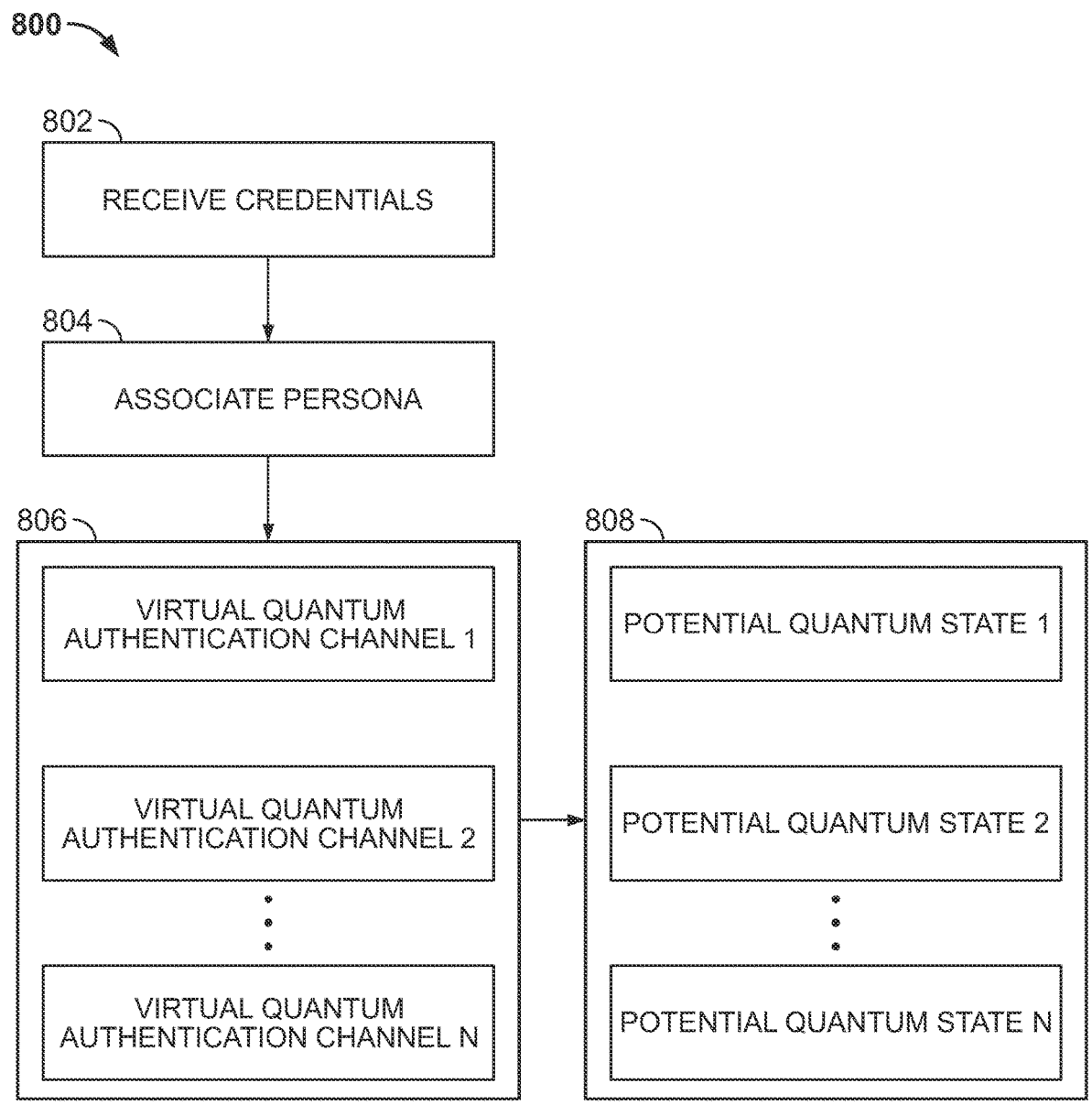
FIG. 8 shows an illustrative process flow in accordance with the principles of the disclosure.

FIG. 8 shows illustrative process flow 800 for tracking quantum interactions using a virtual authentication channel. At 802, the system may receive subpersona credentials. At 804, the system may identify a persona associated with the subpersona credentials for attribute-based authentication at a quantum processor. At 806, the quantum processor may generate a set of virtual authentication channels. Each virtual authentication channel may be associated with a potential state of quantum information 808. The quantum information may be maintained in a virtual transfer channel. Virtual authentication channels 806 may be mapped to quantum states of the quantum information 808. In some embodiments, the quantum processor may generate a set of virtual control channels (not shown). The virtual control channels may also be mapped to quantum states associated with the virtual transfer channel.

Thus, methods and apparatus for a TRACKING QUANTUM BASED INTERACTIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for secure authentication of a user persona at a quantum processor in a quantum information system, the method comprising:

generating a virtual authentication channel comprising a plurality of entangled qubits in a state of superposition, the virtual authentication channel comprising:
a first quantum authentication chain comprising a first set of attributes associated with a user identity, the first set of attributes comprising a number of attributes greater than 1000 attributes;
a second quantum authentication chain comprising a second set of attributes associated with a user device; and
a third quantum authentication chain comprising a third set of attributes associated with a user environment;
validating each set of attributes at predetermined intervals for the duration of a user computing session; and
mapping the virtual authentication channel to a state of quantum information.

2. The method of claim 1, wherein each set of attributes is associated with both a user persona and a user subpersona.

3. The method of claim 1, wherein each set of attributes is dynamically changed by the virtual channel on a periodic basis for the duration of a user session.

4. The method of claim 1, the second set of attributes associated with the user device comprising a number of attributes greater than 1000 attributes.

5. The method of claim 1, wherein each chain is a trust chain.

6. The method of claim 1, wherein the virtual authentication channel is one of a set of virtual authentication channels, each virtual authentication channel associated with a potential state of the quantum information.

7. The method of claim 1, further comprising generating a set of virtual control channels, each virtual control channel associated with a potential state of the quantum information.

8. The method of claim 7, further comprising, in response to accessing the quantum information, mapping the virtual authentication channel from the set of virtual authentication channels and a virtual control channel from the set of virtual control channels to the state of the quantum information.

9. The method of claim 1, further comprising:
routing the user persona to a quantum processor comprising a default number of quantum threads, each quantum thread comprising a default number of quantum circuits; and
automatically scaling the quantum processor during a processing task, the automatic scaling comprising:
adding additional quantum circuits to each quantum thread when the processing task is detected to have a duration that is longer than a threshold duration; and
adding additional quantum threads when the processing task is detected to have a volume that is larger than a threshold volume.

10. A system for secure authentication of a user persona at a hardware quantum circuit in a quantum information system, the system comprising:
a virtual authentication channel comprising a plurality of entangled qubits in a state of superposition, the virtual authentication channel comprising:
a first quantum authentication chain comprising a first set of attributes associated with a user identity;
a second quantum authentication chain comprising a second set of attributes associated with a user device; and
a third quantum authentication chain comprising a third set of attributes associated with a user environment;
wherein:

each set of attributes is substantially continuously authenticated by the virtual authentication channel for the duration of a user computing session; and the hardware quantum circuit is configured to map the virtual authentication channel to a state of quantum information.

11. The system of claim 10, wherein each set of attributes is associated with both a user persona and a user subpersona.

12. The system of claim 10 wherein each set of attributes is dynamically changed by the virtual channel on a periodic basis for the duration of a user session.

13. The system of claim 10, the second set of attributes associated with the user device comprising a number of attributes greater than 1000 attributes.

14. The system of claim 10, wherein each chain is a trust chain.

15. The system of claim 10, wherein the virtual authentication channel is one of a set of virtual authentication channels, each virtual authentication channel associated with a potential state of the quantum information.

16. The system of claim 15, wherein in response to accessing the quantum information, the hardware quantum circuit is configured to:

determine a state of the quantum information; and map the virtual authentication channel from the set of virtual authentication channels to the state of the quantum information.

17. The system of claim 10, the hardware quantum circuit comprising a default number of quantum threads, each quantum thread comprising a default number of quantum circuits, the system configured to:

route the user persona to the hardware quantum circuit; and automatically scale the hardware quantum circuit during a processing task, the automatic scaling comprising:

adding additional quantum circuits to each quantum thread when the processing task is detected to have a duration that is longer than a threshold duration; and adding additional quantum threads when the processing task is detected to have a volume that is larger than a threshold volume.

\* \* \* \* \*